United States Patent
Gong et al.

(10) Patent No.: US 10,205,615 B2
(45) Date of Patent: Feb. 12, 2019

(54) RECEIVING METHOD AND SYSTEM FOR DIGITAL SIMULTANEOUS INFORMATION AND ENERGY TRANSFER

(71) Applicant: South University of Science and Technology of China, Guangdong (CN)

(72) Inventors: Yi Gong, Guangdong (CN); Zhi Quan, Guangdong (CN); Zidong Han, Guangdong (CN)

(73) Assignee: South University of Science & Technology of China, Guangdong (CN)

( * ) Notice: Subject to any disclaimer, the term of this patent is extended or adjusted under 35 U.S.C. 154(b) by 0 days.

(21) Appl. No.: 15/831,961

(22) Filed: Dec. 5, 2017

(65) Prior Publication Data

US 2018/0097670 A1    Apr. 5, 2018

Related U.S. Application Data

(63) Continuation of application No. PCT/CN2015/086138, filed on Aug. 5, 2015.

(30) Foreign Application Priority Data

Jul. 21, 2015   (CN) .......................... 2015 1 0432194

(51) Int. Cl.
   *H02J 7/02*       (2016.01)
   *H04L 27/26*      (2006.01)
   (Continued)

(52) U.S. Cl.
   CPC .......... *H04L 27/2601* (2013.01); *H02J 50/80* (2016.02); *H04L 27/2605* (2013.01); *H04L 27/2647* (2013.01); *H04L 27/32* (2013.01)

(58) Field of Classification Search
   CPC . H04L 27/2601; H04L 27/32; H04L 27/2605; H04L 27/2647; H02J 50/80
   See application file for complete search history.

(56) References Cited

U.S. PATENT DOCUMENTS

2015/0229133 A1*  8/2015  Reynolds ............ H04W 52/281
                                                   307/24
2016/0285519 A1   9/2016  Gong
                    (Continued)

FOREIGN PATENT DOCUMENTS

CN       104158605 A    11/2014
CN       104270798 A     1/2015
                    (Continued)

OTHER PUBLICATIONS

International Search Report, dated Apr. 22, 2016, for corresponding international application PCT/CN2015/086138.

*Primary Examiner* — Dac V Ha
(74) *Attorney, Agent, or Firm* — Myers Wolin, LLC

(57) ABSTRACT

A method is provided for digital Simultaneous Information and Energy Transfer (SIET), comprising the steps of receiving a serial SIET analog signal, and converting the serial SIET analog signal received into a parallel SIET analog signal, extracting an analog information signal and an analog energy signal from the parallel SIET analog signal, performing analog-to-digital conversion on the analog information signal to obtain a digital information signal, and performing information demodulation, parallel-to-serial conversion and decoding on the digital information signal in digital domain, and pre-processing the analog energy signal in analog domain and storing the preprocessed analog energy signal. As the information signal is processed in the digital domain and the energy signal is processed in the analog domain, the energy in the SIET signal can be full collected in receiving side.

9 Claims, 2 Drawing Sheets

(51) Int. Cl.
    *H02J 50/80*    (2016.01)
    *H04L 27/32*    (2006.01)

(56) References Cited

U.S. PATENT DOCUMENTS

2017/0288473 A1* 10/2017 Choi .................. H02J 50/80
2017/0358943 A1* 12/2017 Bocus ................. H02J 7/0068
2018/0139081 A1* 5/2018 Guvenkaya ....... H04L 25/03828

FOREIGN PATENT DOCUMENTS

| CN | 104320219 A | 1/2015 |
| CN | 104469952 A | 3/2015 |
| CN | 104734832 A | 6/2015 |
| CN | 104812078 A | 7/2015 |
| CN | 104836765 A | 8/2015 |
| WO | 2016149948 A1 | 9/2016 |
| WO | 2016149949 A1 | 9/2016 |

* cited by examiner

RECEIVING METHOD AND SYSTEM FOR DIGITAL SIMULTANEOUS INFORMATION AND ENERGY TRANSFER

CROSS REFERENCE TO RELATED APPLICATIONS

This application is a continuation under 35 U.S.C. § 120 of International Application PCT/CN2015/086138, filed Aug. 5, 2015, which claims priority to Chinese Application 201510432194.7, filed Jul. 21, 2015, the contents of each of which are incorporated by reference herein.

FIELD OF THE INVENTION

The present invention relates to an intersection of the wireless communication technology and the wireless power transmission technology, and in particular to a receiving method and system for digital simultaneous information and energy transfer.

BACKGROUND

Simultaneous Wireless Information and Energy Transfer, i.e., simultaneous transfer of information and energy in a wireless manner, is a new kind of communication technologies integrating wireless communication technologies and wireless energy transmission technologies. With the development of science and technology, the integration of the energy technology and the communication technology becomes a trend, which can not only realize a high-speed and reliable communication, but also effectively ease the pressure on scarcity of energy and spectrum, thereby having important application value in industry, medical treatment, infrastructure development, etc. The simultaneous information and energy transfer breaks through the traditional wireless communication means, takes energy attributes into consideration at the same time and integrates the wireless communication technology with the wireless energy transfer technology, thus enabling a parallel and simultaneous transfer of information and energy and has wide application value and innovation significance. The simultaneous information and energy transfer may be used in various wireless terminals or devices which rely on batteries of limited capacity for power supply based on its characteristics, and feed the wireless terminals or devices by harvesting energy from signals, thereby greatly prolonging the standby time, decreasing the device volume and cost and reducing the battery throughput significantly. Therefore, the environmental pollution caused during manufacture and recycling of batteries is greatly reduced. Based on the characteristics of non-contact long-distance transmission, the power supply by batteries or cables can be replaced, and the convenience of the power supply is greatly improved. Based on the characteristics of stability and sustainability, the conventional way of harvesting environmental energy (such as wind energy, solar energy and kinetic energy) by energy harvesters can be replaced. Meanwhile, the simultaneous wireless information and energy transfer is widely applied in the improvement of people's life and brings about great social benefits. In the medical field, there is a serious problem of shortage of battery energy in implanting medical devices such as cardiac pacemakers and cardiovascular robots has a serious shortage problem, the assembly of the simultaneous wireless information and energy transfer can protect patients form severe secondary pains.

In the patent application documents "Transmitting System And Receiving System For Multicarrier Broadband Simultaneous Information And Energy Transfer System" (Application No. 201510133784.X), "Transmitting Method And Receiving Method For Simultaneous Information And Energy Transfer System" (Application No. 201510133428.8) and "Multicarrier Broadband Simultaneous Information And Energy Transfer Optimization Method" (Application No. 201510133789.2), the inventor(s) has (have) proposed a simultaneous information and energy transfer method, wherein baseband signals transmitted by the system contain information baseband signals and energy baseband signals, which are both simultaneously transmitted after being processed correspondingly, and sufficient electric energy is provided to a receiving terminal through the energy signals. The method can be widely applied in the digital communication and analog communication. In an existing digital communication system, wirelessly transmitted signals are analogy signals, and a digital receiving system needs to convert the received analog signals into digital signals by an analog-to-digital conversion unit so that the communication reliability can be improved. However, the energy in the original analog signals is not inherited and will be dissipated in the form of heat. Therefore, if an existing digital receiving system receives a simultaneous information and energy transfer signal, the energy contained in the energy signal will be mostly dissipated. As a result, the receiver cannot obtain sufficient energy from the received signal, resulting in power failure and communication interruption.

SUMMARY

To solve the technical problems, the present invention provides a digital receiving system for multicarrier broadband simultaneous information and energy transfer.

To solve the technical problems, the present invention employs the following technical solutions.

According to the invention, a receiving method for digital Simultaneous Information and Energy Transfer (SIET), comprises the steps of:

receiving a serial SIET analog signal, and converting the serial SIET analog signal received into a parallel SIET analog signal;

extracting an analog information signal and an analog energy signal from the parallel SIET analog signal;

performing analog-to-digital conversion on the analog information signal to obtain a digital information signal, and performing information demodulation, parallel-to-serial conversion and decoding on the digital information signal in digital domain; and pre-processing the analog energy signal in analog domain and storing the preprocessed analog energy signal.

The receiving method further comprises the step of determining whether a signal within a guard interval in the serial SIET analog signal is an energy signal; and if yes, extracting, rectifying and storing the signal within the guard interval.

Further, the step of extracting the information signal and the energy signal from the parallel SIET analog signal comprises:

distinguishing, according to a signal identifier contained in a frame header of the parallel SIET analog signal, the information signal from the energy signal in the parallel SIET analog signal, so as to separate the information signal and the energy signal.

Further, the step of determining whether the signal within the guard interval of the serial SIET analog signal is an energy signal comprises:

the determination is based upon an energy signal identifier, wherein the signal within the guard interval contains a start segment, a principal signal and a stop segment, and wherein the energy signal identifier is contained in the start segment.

Further, the step of pre-processing the analog energy signal in analog domain and storing the preprocessed analog energy signal comprises:

performing energy demodulation, parallel-to-serial conversion, decoding and rectification on the analog energy signal in analog domain and storing the preprocessed analog energy signal into an energy storage unit.

In the invention, a receiving system for digital Simultaneous Information and Energy Transfer (SIET) is disclosed, comprising:

an antenna unit, configured to receive a serial SIET analog signal;

a serial-to-parallel conversion unit, configured to convert the serial SIET analog signal into a parallel SIET analog signal;

a mapping unit, configured to extract an analog information signal and an analog energy signal from the parallel SIET analog signal;

an information signal processing unit, configured to perform analog-to-digital conversion on the analog information signal to obtain a digital information signal, and perform information demodulation, parallel-to-serial conversion and decoding on the digital information signal obtained in digital domain;

an energy signal processing unit, configured to pre-process the analog energy signal in analog domain; and an energy storage unit, configured to store the pre-processed analog energy signal.

The receiving system further comprises a determining unit, configured to determine whether a signal within a guard interval in the serial SIET analog signal is an energy signal; and if yes, extract, rectify and store the signal within the guard interval.

Further, the information signal processing unit comprises an analog-to-digital converter, an information demodulator, a parallel-to-serial converter and a decoder, which are connected successively.

Further, the energy signal processing unit comprises an energy demodulator, an energy parallel-to-serial converter, a decoder and a rectifier, which are connected successively.

The present invention has the following beneficial effects: in the present invention, by distributing an information signal and an energy signal in a digital simultaneous information and energy transfer signal, and performing demodulation and decoding on the information signal in a digital domain and processing the energy signal in an analog domain, a receiving terminal can fully collect energy signals in simultaneous transfer signals.

DETAILED DESCRIPTION OF THE PREFERRED EMBODIMENTS

The principle and features of the present invention will be described below by embodiments with reference to the accompanying drawings. The embodiments herein are merely exemplary and provided to illustrate the present invention and are not intended to limit the scope of the present invention.

Figure 1:
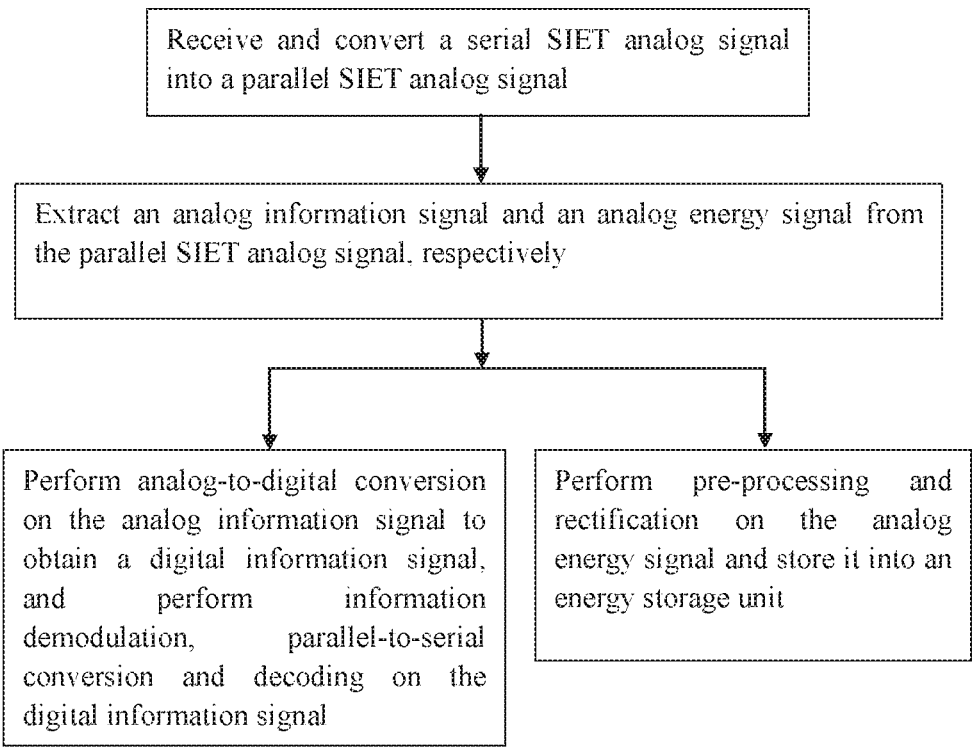
FIG. 1 is a schematic flowchart of a receiving method for digital simultaneous information and energy transfer of the invention.

FIG. 1 is a schematic flowchart of a receiving method for digital Simultaneous Information and Energy Transfer (SIET). As shown in FIG. 1, the receiving method for digital simultaneous information and energy transfer of the present invention comprises the steps of:

receiving a serial SIET analog signal, and converting the serial SIET analog signal received into a parallel SIET analog signal;

extracting an analog information signal and an analog energy signal from the parallel SIET analog signal;

performing analog-to-digital conversion on the analog information signal to obtain a digital information signal, and performing information demodulation, parallel-to-serial conversion and decoding on the digital information signal obtained in digital domain; and pre-processing the analog energy signal in analog domain and storing the pre-processed analog energy signal.

According to a preferred embodiment, the receiving method further comprises the step of:

determining whether a signal within a guard interval in the serial SIET analog signal is an energy signal; and if yes, extracting, rectifying and storing the signal within the guard interval.

According to a preferred embodiment, the step of extracting the information signal and the energy signal from the parallel SIET analog signal comprises:

distinguishing, according to a signal identifier contained in a frame header of the parallel SIET analog signal, an information signal from an energy signal in the parallel SIET analog signal, so as to separate the information signal and the energy signal.

According to a preferred embodiment, in the step of determining whether the signal within the guard interval in the serial SIET analog signal is an energy signal:

the signal within the guard interval contains: a start segment, a principal signal and a stop segment; and the start segment contains an energy signal identifier.

According to a preferred embodiment, the step of pre-processing the analog energy signal in analog domain and storing the preprocessed analog energy signal comprises:

performing energy demodulation, parallel-to-serial conversion, decoding and rectification on the analog energy signal in analog domain and storing the preprocessed analog energy signal into an energy storage unit.

Figure 2:
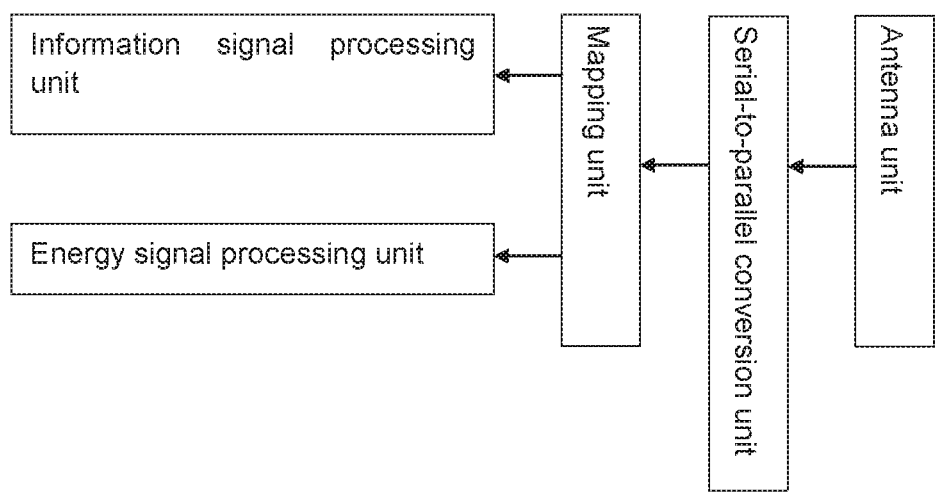
FIG. 2 is a schematic diagram of a receiving system for digital simultaneous information and energy transfer of the invention.

FIG. 2 is a schematic diagram of a receiving system for digital SIET. As shown in FIG. 2, the receiving system for digital SIET disclosed by the present invention comprises:

an antenna unit, configured to receive a serial SIET analog signal;

a serial-to-parallel conversion unit, configured to convert the serial SIET analog signal into a parallel SIET analog signal;

a mapping unit, configured to separate an analog information signal and an analog energy signal from the parallel SIET analog signal;

an information signal processing unit, configured to perform analog-to-digital conversion on the analog information signal to obtain a digital information signal, and perform information demodulation, parallel-to-serial conversion and decoding on the digital information signal in digital domain;

an energy signal processing unit, configured to pre-process the analog energy signal in analog domain; and an energy storage unit, configured to store the pre-processed analog energy signal.

In a preferred embodiment, the receiving system further a determination unit. The determination unit is configured to determine whether a signal within a guard interval in the serial SIET analog signal is an energy signal; and if yes, extract the signal within the guard interval, rectify the extracted signal, and store the rectified signal into the energy storage unit.

In a preferred embodiment, the information signal processing unit comprises an analog-to-digital converter, an information demodulator, a parallel-to-serial converter and a decoder, which are connected successively.

In a preferred embodiment, the energy signal processing unit comprises an energy demodulator, an energy parallel-to-serial converter, a decoder and a rectifier, which are connected successively.

Figure 3:
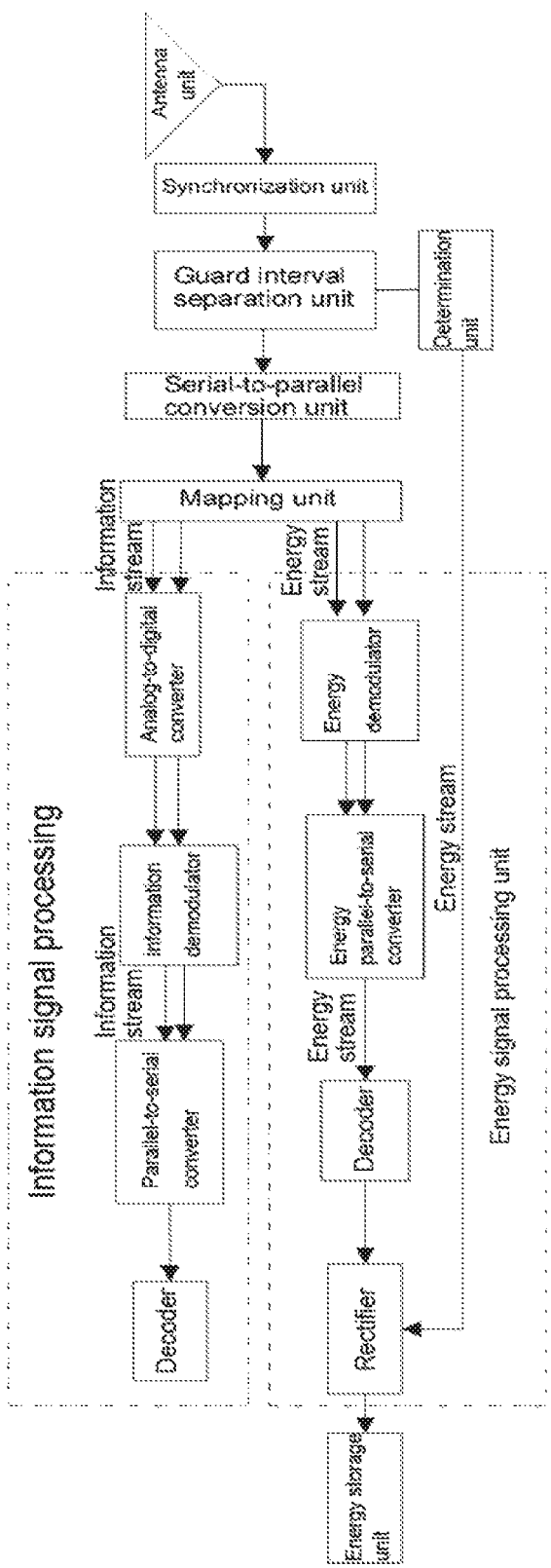
FIG. 3 is a schematic diagram of the receiving system of digital simultaneous information and energy transfer according to a specific embodiment of the invention.

FIG. 3 is a schematic diagram of a receiving system for digital SIET according to a specific embodiment of the invention. As shown in FIG. 3, in this specific embodiment, a serial SIET analog signal received by the system comprises a signal within a valid interval generated based on information to be transmitted and energy to be transmitted, and another signal within a guard interval generated based on the valid interval. As shown in FIG. 3, in this specific embodiment, the SIET analog signal is received by the antenna unit of the receiving system for digital SIET. The system further comprise a synchronization unit for phase synchronization between the serial signal received and it in a transmitting terminal; and a guard interval separation unit configured to separate the serial SIET signal processed by the synchronization unit, based on the guard interval. The determination unit of the system determines whether the signal within the guard interval in the serial SIET signal contains an energy signal. In the case that the signal within the guard interval contains an energy signal, the determination unit extracts the signal within the guard interval, and feeds the extracted signal into the rectifier for rectification. The rectified signal is stored in the energy storage unit.

The signal within the valid interval in the serial SIET signal is separated by the guard interval separation unit, and then serial-to-parallel converted by the serial-to-parallel conversion unit into a parallel SIET analog signal. The parallel SIET analog signal is then separated by the mapping unit of the system into an analog information signal and an analog energy signal.

On the one hand, the analog information signal is analog-to-digital converted by the analog-to-digital converter in the signal processing unit and further processed in digital domain.

On the other hand, the analog energy signal is processed in analog domain by the energy processing unit and stored into the energy storage unit.

The forgoing description merely shows preferred embodiments of the present invention and is not intended to limit the present invention. Any modification, equivalent replacement and improvement made within the spirit and principle of the present invention shall fall into the protection scope of the present invention.

What is claimed is:

1. A receiving method for digital Simultaneous Information and Energy Transfer (SIET), comprising:
   receiving a serial SIET analog signal, and converting the serial SIET analog signal received into a parallel SIET analog signal;
   extracting an analog information signal and an analog energy signal from the parallel SIET analog signal;
   performing analog-to-digital conversion on the analog information signal to obtain a digital information signal, and performing information demodulation, parallel-to-serial conversion and decoding on the digital information signal in digital domain; and
   pre-processing the analog energy signal in analog domain and storing the preprocessed analog energy signal.

2. The receiving method of claim 1, further comprising:
   determining whether a signal within a guard interval in the serial SIET analog signal is an energy signal; and if yes, extracting, rectifying and storing the signal in the guard interval.

3. The receiving method of claim 1, wherein the step of extracting the information signal and the energy signal from the parallel SIET analog signal comprises:
   distinguishing, according to a signal identifier contained in a frame header of the parallel SIET analog signal, the information signal from the energy signal in the parallel SIET analog signal, so as to separate the information signal and the energy signal.

4. The receiving method of claim 2, wherein in the step of determining whether the signal within the guard interval of the serial SIET analog signal is an energy signal, the determination is based upon an energy signal identifier, and wherein the signal within the guard interval contains a start segment, a principal signal and a stop segment, and wherein the energy signal identifier is contained in the start segment.

5. The receiving method of claim 1, wherein the step of pre-processing the analog energy signal in analog domain and storing the preprocessed analog energy signal, comprises:
   performing energy demodulation, parallel-to-serial conversion, decoding and rectification on the analog energy signal in analog domain and storing the preprocessed analog energy signal into an energy storage unit.

6. A receiving system for digital Simultaneous Information and Energy Transfer (SIET), comprising:
   an antenna unit, configured to receive a serial SIET analog signal;
   a serial-to-parallel conversion unit, configured to convert the serial SIET analog signal into a parallel SIET analog signal;
   a mapping unit, configured to extract an analog information signal and an analog energy signal from the parallel SIET analog signal;
   an information signal processing unit, configured to perform analog-to-digital conversion on the analog information signal to obtain a digital information signal, and perform information demodulation, parallel-to-serial conversion and decoding on the digital information signal obtained in digital domain;
   an energy signal processing unit, configured to pre-process the analog energy signal in analog domain; and
   an energy storage unit, configured to store the pre-processed analog energy signal.

7. The receiving system of claim 6, further comprising:
a determining unit, configured to determine whether a signal within a guard interval in the serial SIET analog signal is an energy signal; and if yes, extract, rectify and store the signal within the guard interval.

8. The receiving system of claim 6, wherein, the information signal processing unit comprises an analog-to-digital converter, an information demodulator, a parallel-to-serial converter and a decoder, which are connected successively.

9. The receiving system of claim 6, wherein, the energy signal processing unit comprises an energy demodulator, an energy parallel-to-serial converter, a decoder and a rectifier, which are connected successively.

* * * * *